United States Patent
Mizrahi et al.

(10) Patent No.: US 10,411,983 B2
(45) Date of Patent: Sep. 10, 2019

(54) LATENCY MONITORING FOR NETWORK DEVICES

(71) Applicant: Marvell Israel (M.I.S.L) Ltd., Yokneam (IL)

(72) Inventors: Tal Mizrahi, Haifa (IL); David Melman, Halutz (IL); Adar Peery, Aseret (IL); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 6 days.

(21) Appl. No.: 15/598,105

(22) Filed: May 17, 2017

(65) Prior Publication Data

US 2017/0339041 A1 Nov. 23, 2017

Related U.S. Application Data

(60) Provisional application No. 62/338,054, filed on May 18, 2016, provisional application No. 62/338,061, filed on May 18, 2016.

(51) Int. Cl.
| | |
|---|---|
| *H04L 12/26* | (2006.01) |
| *H04L 29/06* | (2006.01) |
| *H04L 29/14* | (2006.01) |

(52) U.S. Cl.
CPC ........ *H04L 43/0888* (2013.01); *H04L 43/022* (2013.01); *H04L 43/026* (2013.01);
(Continued)

(58) Field of Classification Search
CPC ............................ H04L 43/0888; H04L 69/22
See application file for complete search history.

(56) References Cited

U.S. PATENT DOCUMENTS

| | | | |
|---|---|---|---|
| 8,228,923 B1* | 7/2012 | Jain ....................... | H04J 3/0682 370/350 |
| 2008/0247331 A1* | 10/2008 | Becker ................ | H04L 43/0858 370/253 |

(Continued)

OTHER PUBLICATIONS

IEEE Std. 1588™-2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).

(Continued)

*Primary Examiner* — Chi H Pham
*Assistant Examiner* — Weibin Huang

(57) ABSTRACT

A network device comprises time measurement units configured to measure receipt times and transmit times of packets received/transmitted via network interfaces. One or more memories store configuration information that indicates certain network interface pairs and/or certain packet flows that are enabled for latency measurement. A packet processor includes a latency monitoring trigger unit configured to select, using the configuration information, packets that are forwarded between the certain network interface pairs and/or that belong to the certain packet flows for latency monitoring. One or more latency measurement units determine respective latencies for packets selected by the latency monitoring trigger unit using respective receipt times and respective transmit times for the packets selected by the latency monitoring trigger unit, calculates latency statistics for the certain network interface pairs and/or the certain packet flows using the respective latencies, and stores the latency statistics in the one or more memories.

16 Claims, 6 Drawing Sheets

(52) U.S. Cl.
CPC .......... *H04L 43/0852* (2013.01); *H04L 69/22* (2013.01); *H04L 69/28* (2013.01); *H04L 69/40* (2013.01)

(56) References Cited

U.S. PATENT DOCUMENTS

| | | | | |
|---|---|---|---|---|
| 2012/0106365 A1* | 5/2012 | Terry | .................. | H04L 41/5009 |
| | | | | 370/252 |
| 2012/0233363 A1* | 9/2012 | Gulati | ...................... | G06F 9/52 |
| | | | | 710/56 |
| 2013/0329572 A1* | 12/2013 | Gintis | ................... | H04L 43/026 |
| | | | | 370/244 |
| 2015/0071292 A1* | 3/2015 | Tripathi | .................. | H04L 45/66 |
| | | | | 370/392 |
| 2015/0263922 A1* | 9/2015 | Edsall | .................. | H04L 43/028 |
| | | | | 370/252 |

OTHER PUBLICATIONS

Mills et al., "Network Time Protocol Version 4: Protocol and Algorithms Specification," Request for Comments: 5905, *Internet Engineering Task Force (IETF)*, pp. 1-111 (Jun. 2010).

Simanic et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24 (2011).

International Search Report and Written Opinion in International Patent Application No. PCT/IB17/52907, dated Aug. 30, 2017 (19 pages).

\* cited by examiner

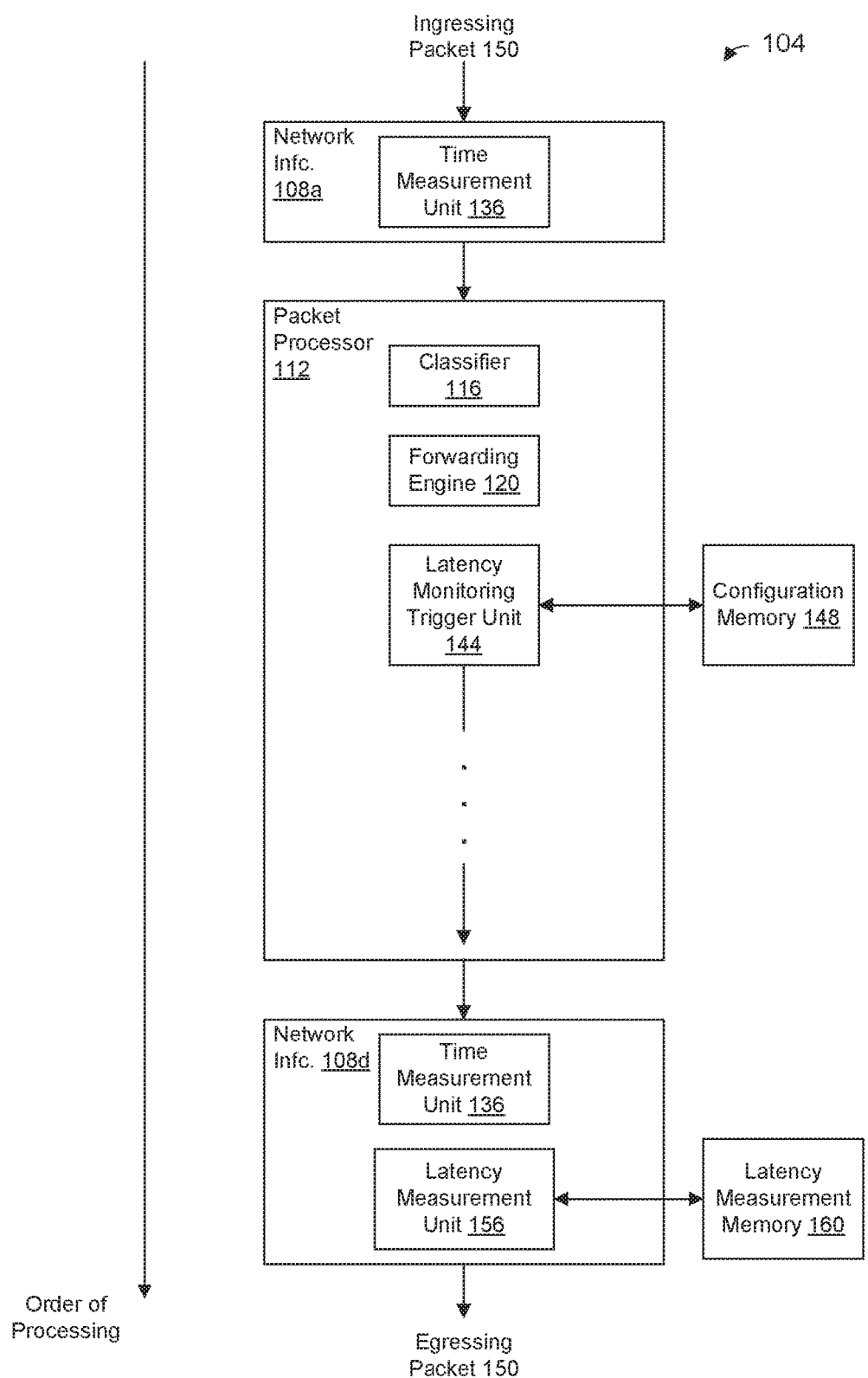

LATENCY MONITORING FOR NETWORK DEVICES

CROSS REFERENCES TO RELATED APPLICATIONS

This application claims the benefit of U.S. Provisional Patent App. No. 62/338,061, entitled "Latency Monitoring in Network Devices," filed on May 18, 2016, and U.S. Provisional Patent App. No. 62/338,054, entitled "Method for Efficient Computation of Exponentially Weighted Moving Average," filed on May 18, 2016, the disclosures of both of which are hereby expressly incorporated herein by reference in their entireties.

FIELD OF TECHNOLOGY

The present disclosure relates generally to communication networks, and more particularly to measuring latency in a network device.

BACKGROUND

In a network device, it is often useful to measure performance metrics such as internal packet latency. Such metrics are useful for detection of faults and anomalies in the network device and/or in a communication network.

To measure internal latency, a network device records a time at which a packet is received (receipt time) by the network device, and also records a time at which the packet is transmitted (transmit time) by the network device. The network device compares the transmit time with the receipt time to calculate a latency measurement for the packet. The network device uses latency measurements for multiple packets to calculate latency statistics. For example, a network device may compute respective latency statistics for different ingress port, egress port pairs.

SUMMARY

In an embodiment, a network device comprises a plurality of network interfaces configured to couple to a plurality of network links, wherein network interfaces among the plurality of network interfaces include, or are associated with, respective time measurement units configured to measure a) receipt times at which packets are received via network links and b) transmit times at which packets are transmitted via network links. The network device also comprises one or more memories to store configuration information, the configuration information indicating certain network interface pairs and/or certain packet flows that are enabled for latency measurement. Additionally, the network device comprises a packet processor coupled to the plurality of network interfaces, the packet processor including: a latency monitoring trigger unit coupled to the one or more memories, the latency monitoring trigger unit configured to select, using the configuration information, packets that are forwarded between the certain network interface pairs and/or that belong to the certain packet flows for latency monitoring. The network device further comprises one or more latency measurement units coupled to the one or more memories, the one or more latency measurement units configured to: determine respective latencies for packets selected by the latency monitoring trigger unit using respective receipt times and respective transmit times for the packets selected by the latency monitoring trigger unit, calculate latency statistics for the certain network interface pairs and/or the certain packet flows using the respective latencies, and store the latency statistics in the one or more memories.

In another embodiment, a method includes: receiving a plurality of packets via a plurality of network interfaces of a network device; measuring, at the network device, respective receipt times at which packets were received via network links among the plurality of network interfaces; selecting, at the network device, packets that are being forwarded between certain network interface pairs and/or belong to certain packet flows for measuring latency using configuration information stored in one or more memories of the network device, the configuration information indicating certain network interface pairs and/or certain packet flows that are enabled for latency measurement; measuring, at the network device, respective transmit times at which packets are transmitted via network links among the plurality of network links; determining, at the network device, respective latencies for selected packets, that are being forwarded between the certain network interface pairs and/or belong to the certain packet flows indicated by the configuration information, using respective receipt times and respective transmit times for the selected packets; and storing the latency information corresponding to the certain network interface pairs and/or the certain packet flows in the one or more memories of the network device.

BRIEF DESCRIPTION OF THE DRAWINGS

FIG. 1B is a block diagram showing another view of the network device of FIG. 1A, according to an embodiment.

DETAILED DESCRIPTION

Computing respective latency statistics for every ingress port, egress port pair becomes more resource intensive as the number of ports of the network device increases. For example, computing latency statistics based on every packet requires high computational resources, and recording latency statistics for every ingress port, egress port pair requires separate memory storage for each ingress port, egress port pair in some implementations. Thus, in embodiments described below, a network device calculates latency statistics for selected ingress port, egress port pairs and/or selected packet flows. Also, in embodiments described below, a network device computes latency statistics for sampled packets rather than for every single packet.

Figure 1A:
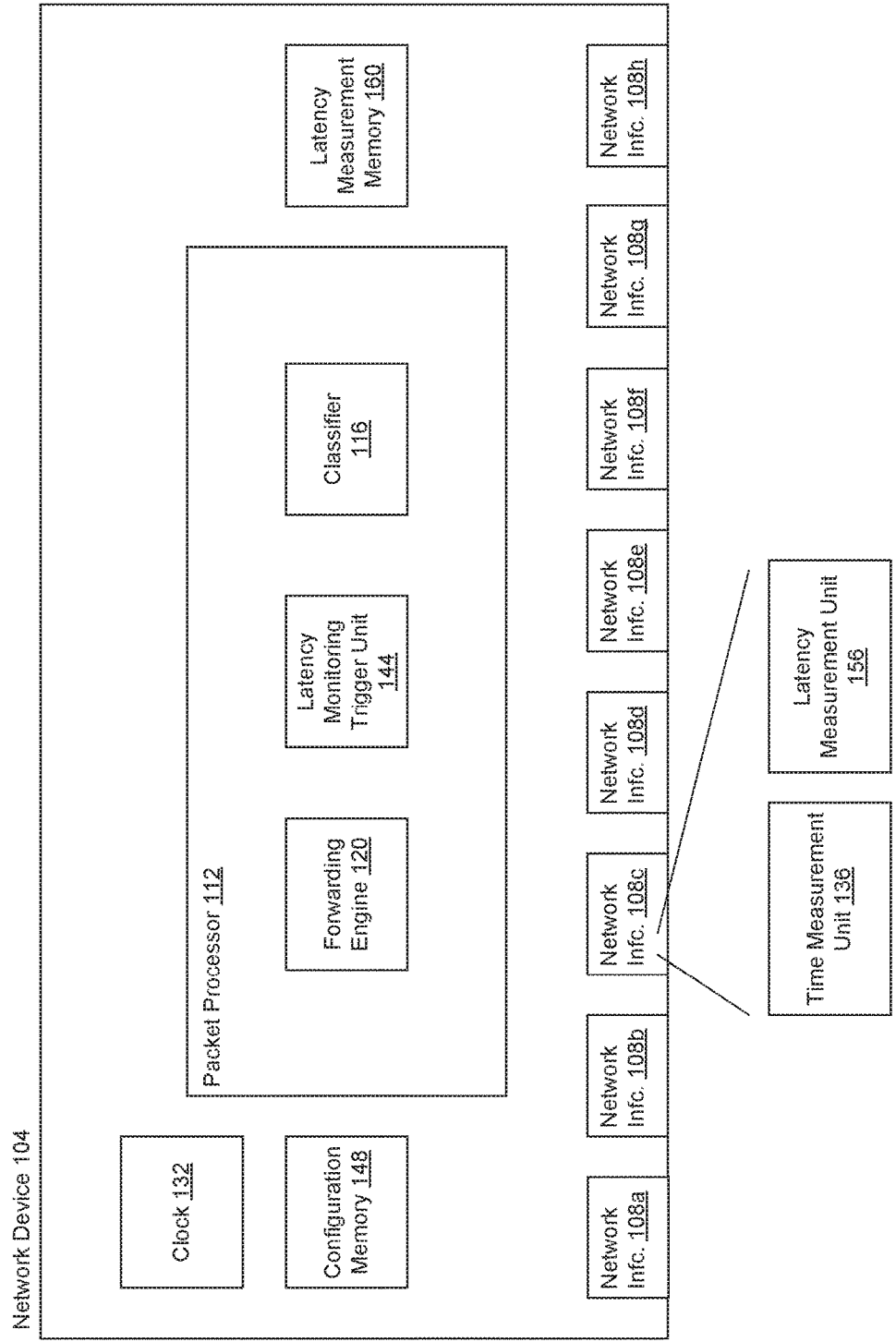
FIG. 1A is a block diagram of an example network device configured to make internal latency measurements, according to an embodiment.

FIG. 1A is a block diagram of an example network device 104 that is configured to measure internal packet latency, according to an embodiment. The network device 104 includes a plurality of network interfaces (e.g., ports) 108 configured to couple to respective network links. The network device 104 also includes a packet processor 112 coupled to the ports 108. The packet processor 112 is configured to process packets received via the ports 108, and to determine one or more other ports 108 via which packets are to be forwarded to one or more external devices.

In an embodiment, the packet processor 112 is configured to store identifiers of network interfaces 108 via which packets are received by the network device 100 (referred to herein as "source network interfaces") in respective data units corresponding to the packets, such as a packet descriptors corresponding to the packets.

In an embodiment, the packet processor 112 includes a packet classifier 116. The packet classifier 116 is configured to determine to which packet flow a packet belongs by analyzing information in a header of the packet, according to an embodiment. A packet flow corresponds to packets sharing certain shared characteristics. For example, a particular packet flow may be defined as packets with headers having a particular source address and a particular destination address, in an embodiment. In various embodiments, a packet flow may be defined as packets with headers having particular common information such as one or more of i) a particular source address, ii) a particular destination address, iii) a particular virtual local area network (VLAN) identifier (ID), iv) a particular priority, v) a particular packet type, etc. The packet classifier 116 is configured to assign respective flow IDs to at least some packets, where the flow IDs indicate the respective flows to which packets belong, according to an embodiment. The packet classifier 116 is configured to store the flow ID assigned to a packet in the packet descriptor corresponding to the packet, according to an embodiment.

In some embodiments, the packet classifier 116 includes, or is coupled to, a ternary content addressable memory (TCAM) (not shown), or another suitable storage device, that stores correspondences between particular header information and flow IDs; and the packet classifier 116 is configured to use header information of a packet to perform a lookup in the TCAM (or other suitable storage device) to determine a particular flow ID to be assigned to the packet.

The packet processor 112 also includes a forwarding engine 120. The forwarding engine 120 is configured to analyze header information in packets to determine network interfaces 108 via which the packets are to be transmitted (referred to herein as "target network interfaces"). As merely an illustrative example, the forwarding engine 120 is configured to use a destination address in a header of a packet to perform a lookup in a forwarding database (not shown), which stores correspondences between destination addresses and network interfaces 108, to determine a particular network interface 108 via which the packet is to be transmitted. As another illustrative example, the forwarding engine 120 is configured to use a VLAN ID in a header of a packet to perform a lookup in a forwarding database (not shown) (e.g. the same forwarding database discussed above or a different forwarding database), which stores correspondences between VLAN IDs and network interfaces 108, to determine a particular set of target network interfaces 108 for the packet. The forwarding engine 120 is configured to store an ID of a target network interface (or set of multiple target network interfaces) in the packet descriptor corresponding to the packet, according to an embodiment.

The network device also includes a clock 132. The clock 132 is a time-of-day clock, in an embodiment. The clock 132 is another type of clock suitable for measuring internal packet latency, in an embodiment.

Each of at least some of the network interfaces 108 includes a time measurement unit 136, which is coupled to the clock 132. In another embodiment, at least some of time measurement units 136 are distinct from, but associated with, respective network interfaces 108. The time measurement unit 136 is configured to record respective receipt times of packets received at the corresponding network interface 108, and to record respective transmit times of packets transmitted via the corresponding network interface 108. In an embodiment, the time measurement unit 136 is configured to store the receipt time of a packet received at the corresponding network interface 108 in the packet descriptor corresponding to the packet. In another embodiment, the time measurement unit 136 is configured to send the receipt time of a packet to the packet processor 112, and the packet processor 112 is configured to store the receipt time in the packet descriptor corresponding to the packet.

The packet processor 112 also includes a latency monitoring trigger unit 144 coupled to a configuration memory 148. The configuration memory 148 includes configuration information that indicates network interfaces 108 that are enabled for latency monitoring, according to an embodiment. The configuration memory 148 includes configuration information that indicates flow IDs that are enabled for latency monitoring, according to another embodiment. The configuration memory 148 includes both i) configuration information that indicates network interfaces 108 that are enabled for latency monitoring, and ii) configuration information that indicates flow IDs that are enabled for latency monitoring, according to another embodiment. In still other embodiments, the configuration memory 148 includes other suitable configuration information indicating for which packets latency monitoring should be performed.

The latency monitoring trigger unit 144 is configured to, for at least some packets being processed by the packet processor 112, analyze i) configuration information stored in the configuration memory 148 and ii) information corresponding to the packet (e.g., in a packet descriptor corresponding to the packet) to determine for which of the packets latency monitoring should be performed. For example, in an embodiment, the latency monitoring trigger unit 144 analyzes i) a packet descriptor corresponding to the packet, and ii) configuration information stored in the configuration memory 148 to determine whether a source network interface 108 and a target network interface 108 are enabled for latency monitoring. As another example, in an embodiment, the latency monitoring trigger unit 144 analyzes i) a packet descriptor corresponding to the packet, and ii) configuration information stored in the configuration memory 148 to determine whether a flow to which the packet corresponds is enabled for latency monitoring.

Additionally or alternatively, the latency monitoring trigger unit 144 is configured to, for at least some packets being processed by the packet processor 112, determine for which packets latency monitoring should be performed according to a sampling scheme, in some embodiments. For instance, the latency monitoring trigger unit 144 chooses every k-th packet for latency monitoring, where k is a suitable positive integer, in an embodiment. As another example, the latency monitoring trigger unit 144 randomly or pseudo-randomly selects packets for latency monitoring such that not all packets are selected, in an embodiment. In an embodiment, packets are selected (e.g., sampled) from among any packets forwarded between a particular pair of ports. In another embodiment, packets are selected (e.g., sampled) from among any packets belonging to a particular flow, e.g., packets corresponding to a same flow ID. In another embodiment, packets are selected (e.g., sampled) from among all packets that the latency monitoring trigger unit 144 otherwise determines latency monitoring should be performed.

The latency monitoring trigger unit 144 is configured to store information in respective packet descriptors indicating whether latency measurements should be made for respective packets.

In an embodiment, the packet processor 112 comprises a hardware pipeline processor, and the classifier 116, the forwarding engine 120, and the latency monitoring trigger unit 144 are pipeline elements of the pipeline processor. In another embodiment, the packet processor 112 comprises multiple processors configured to execute machine readable instructions stored in one or more memories (not shown), where the classifier 116, the forwarding engine 120, and the latency monitoring trigger unit 144 are implemented by the multiple processors executing machine readable instructions.

A latency measurement unit 156 is configured to, in connection with a packet being transmitted via a target network interface 108, determine whether the packet is enabled for latency measurement and selectively calculate a latency measurement if the packet is enabled for latency measurement. For example, the latency measurement unit 156 is configured to calculate a latency measurement using a receipt time and a transmit time of the packet. The latency measurement unit 156 is also configured to use the latency measurement (if calculated) to calculate one or more latency statistics corresponding to a source network interface, target network interface pair, flow ID, etc., corresponding to the packet.

The latency measurement unit 156 is coupled to a latency measurement memory 160, and the latency measurement unit 156 is configured to store latency statistics calculated by the latency measurement unit 156 in the latency measurement memory 160. In the embodiment of FIG. 1, the configuration memory 148 and the latency measurement memory 160 are included in separate memories. In another embodiment, however, a single memory device includes at least some of the configuration memory 148 and at least some of the latency measurement memory 160.

In an embodiment, each of at least some network interfaces 108 includes a respective latency measurement unit 156. In another embodiment, at least some of latency measurement units 156 are distinct from, but associated with, respective network interfaces 108. In an embodiment, one or more latency measurement units 156 are associated with at least some network interfaces 108, and a latency measurement unit 156 is configured to calculate latency information corresponding to a group of two or more network interfaces 108.

In operation, the latency monitoring trigger unit 144 acts to filter packets for latency measurement (e.g., by marking packet descriptors corresponding to the packets) according to configuration data stored in the configuration memory 148, so that the latency measurement unit 156 performs latency measurement operations for filtered packets, according to an embodiment. For example, the configuration data stored in the configuration memory 148 indicates certain port pairs for which latency measurement is enabled, and the latency monitoring trigger unit 144 thus acts to mark packets forwarded between the certain port pairs, so that the latency measurement unit 156 performs latency measurement operations for packets forwarded between the certain port pairs, according to an embodiment. As another example, the configuration data stored in the configuration memory 148 indicates certain flow IDs for which latency measurement is enabled, and the latency monitoring trigger unit 144 thus marks packets associated with the certain flow IDs, so that the latency measurement unit 156 performs latency measurement operations for packets associated with the certain flow IDs, according to an embodiment.

FIG. 1B is another block diagram of the example network device 104 that generally illustrates an order of processing of a packet 150 by components of the network device 104, according to an embodiment. FIG. 1B is merely one illustrative example of an order of processing, and packets may be processed according to another suitable order in other embodiments.

The packet 150 is received at network interface 108a, and the time measurement unit 136 of (or associated with) network interface 108a records a receipt time of the packet 150. The time measurement unit 136 stores the receipt time in a packet descriptor corresponding to the packet 150, in an embodiment. The packet processor 112 subsequently stores the receipt time in the packet descriptor, in another embodiment.

The network interface 108a stores, in the packet descriptor, an indicator of the network interface 108a as a source network interface for the packet 150, in an embodiment. The packet processor 112 subsequently stores, in the packet descriptor, the indicator of the network interface 108a as the source network interface for the packet 150, in another embodiment.

The classifier 116 determines a flow to which the packet 150 corresponds and stores a corresponding flow ID in the packet descriptor. The forwarding engine 120 determines that the packet 150 is to be transmitted via the network interface 108d, and stores, in the packet descriptor, an indicator of the network interface 108d as a target network interface for the packet 1150.

The latency monitoring trigger unit 144 analyzes i) configuration information stored in the configuration memory 148 and ii) information in the packet descriptor corresponding to the packet 150 to determine whether latency monitoring should be performed for the packet 150. For example, in an embodiment, the latency monitoring trigger unit 144 determines that the network interface 108a (the source network interface) and the network interface 108d (the target network interface) are both enabled for latency monitoring. As another example, in an embodiment, the latency monitoring trigger unit 144 determines that the flow to which the packet 150 corresponds is enabled for latency monitoring.

Additionally or alternatively, the latency monitoring trigger unit 144 determines, according to a sampling scheme, that the packet 150 is enabled for latency monitoring, in some embodiments.

In response to determining that latency monitoring is to be performed for the packet 150, the latency monitoring trigger unit 144 stores information in the packet descriptor that indicates latency measurement should be performed for the packet 150. Thus, the latency monitoring trigger unit 144 acts to filter packets for latency measurement (e.g., by marking packet descriptors corresponding to the packets) according to configuration data stored in the configuration memory 148, according to an embodiment. For example, the configuration data stored in the configuration memory 148 indicates certain port pairs for which latency measurement is enabled, and the latency monitoring trigger unit 144 thus acts to mark packets forwarded between the certain port pairs to indicate that latency monitoring is to be performed, according to an embodiment. As another example, the configuration data stored in the configuration memory 148 indicates certain flow IDs for which latency measurement is enabled, and the latency monitoring trigger unit 144 thus marks packets associated with the certain flow IDs to indicate that latency monitoring is to be performed, according to an embodiment.

Eventually, the packet 150 is provided to the network interface 108*d* for transmission. The time measurement unit 136 of (or associated with) the network interface 108*d* records a transmit time of the packet 150.

The latency measurement unit 156 of (or associated with) the network interface 108*d* analyzes the packet descriptor and determines that the packet 150 is enabled for latency measurement, according to an embodiment. In connection with the packet 150 being transmitted via the target network interface 108*d*, the latency measurement unit 156 calculates a latency measurement for the packet 150. For example, the latency measurement unit 156 calculates a latency measurement using the receipt time and the transmit time of the packet 150. The latency measurement unit 156 also uses the latency measurement to calculate one or more latency statistics corresponding to i) the source network interface, target network interface pair, and/or ii) the flow ID of the flow to which the packet 150 belongs, etc. The latency measurement unit 156 then stores latency statistics calculated in connection with the packet 150 in the latency measurement memory 160. Thus, the latency measurement unit 156 performs latency measurement operations for packets filtered by the latency monitoring trigger unit according to configuration data stored in the configuration memory 148, according to an embodiment. For example, the latency measurement unit 156 performs latency measurement operations for packets forwarded between certain port pairs indicated by configuration data stored in the configuration memory, according to an embodiment. As another example, the latency measurement unit 156 performs latency measurement operations for packets belonging to certain flows indicated by configuration data stored in the configuration memory, according to an embodiment.

In an embodiment, the latency measurement unit 156 does not perform latency measurement operations for, or store latency statistics corresponding to, packets that the latency monitoring trigger unit 144 has not marked, according to an embodiment, thus saving computational resources and/or memory resources.

Figure 2:
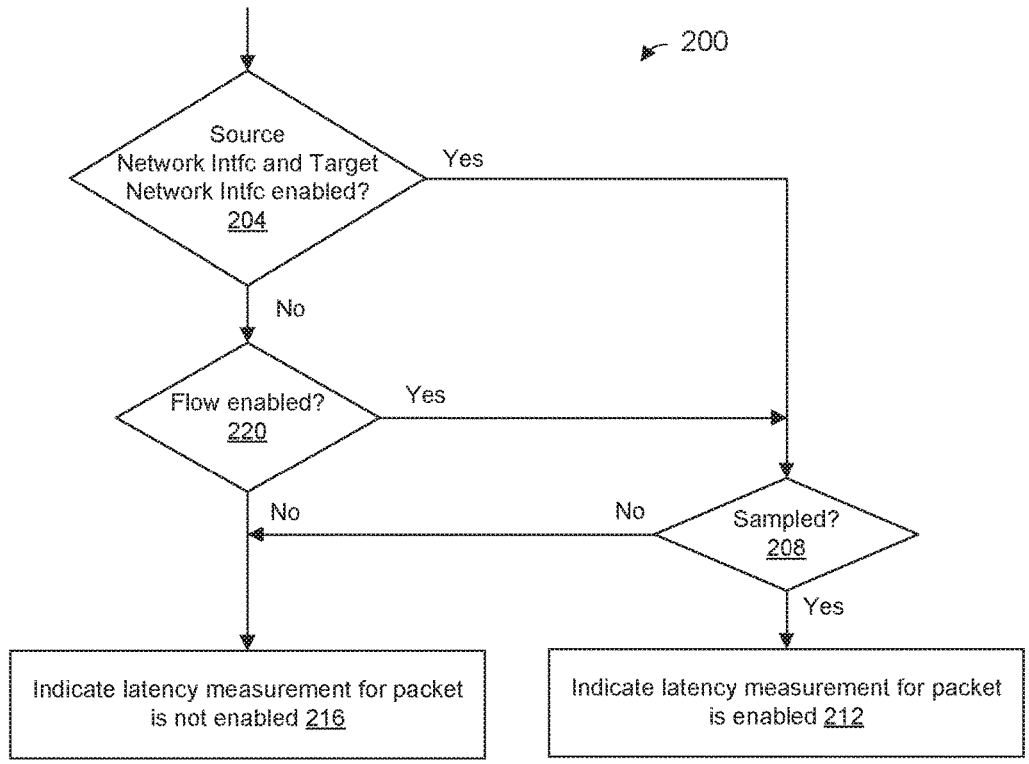
FIG. 2 is a flow diagram of an example method for determining whether a latency measurement should be performed for a packet received at a network device, according to an embodiment.

FIG. 2 is a flow diagram of an example method 200 for determining whether a latency measurement should be performed for a packet received at a network device, according to an embodiment. The latency monitoring trigger unit 144 (FIGS. 1A and 1B) is configured to implement the method 200, according to an embodiment, and FIG. 2 is described in the context of the network device 100 (FIGS. 1A and 1B) for explanatory purposes. In other embodiments, however, another suitable device (other than the latency monitoring trigger unit 144) is configured to implement the method 200 and/or the method 200 is performed in another suitable network device other than the network device 100 (FIGS. 1A and 1B).

At block 204, it is determined whether both i) a source network interface 108 (e.g., a network interface 108 at which the packet is received), and ii) a target network interface 108 (e.g., a network interface 108 at which the packet will be transmitted) are enabled for latency measurement. For example, in embodiments in which an indicator of the source network interface 108 and an indicator of the target network interface 108 are stored in a packet descriptor corresponding to the packet, the indicator of the source network interface 108 and the indicator of the target network interface 108 in the packet descriptor are analyzed to determine whether both are enabled for latency measurement. In an embodiment, block 204 includes analyzing configuration information stored in a memory (e.g., the memory 148 of FIGS. 1A and 1B) to determine whether the source network interface 108 and the target network interface 108 are both are enabled for latency measurement.

If it is determined at block 204 that both i) the source network interface 108, and ii) the target network interface 108 are enabled for latency measurement, the flow proceeds to block 208. At block 208, a sampling scheme is utilized to determine whether a latency measurement should be performed for the packet. For instance, every k-th packet that is determined to be otherwise enabled for latency monitoring is selected for latency monitoring, according to an embodiment. As another example, every k-th packet with both i) the source network interface 108, and ii) the target network interface 108 is selected, according to another embodiment. As yet another example, every k-th packet in a particular flow is selected, according to another embodiment. As still another example, the sampling scheme involves a random or pseudo-random selection according to a defined probability, in an embodiment.

If it is determined at block 208 that the packet is selected for latency measurement, the flow proceeds to block 212. At block 212, latency measurement for the packet is indicated as enabled. For example, an indicator that latency measurement for the packet is enabled is stored in a data unit, e.g., a packet descriptor, associated with the packet, according to an embodiment. The indicator is a field (e.g., a single bit field, a multi-bit field, etc.) in the packet descriptor, in an embodiment, and the field is set to a value that indicates that latency measurement for the packet is enabled.

On the other hand, if it is determined at block 208 that the packet is not selected for latency measurement, the flow proceeds to block 216. At block 216, latency measurement for the packet is indicated as not enabled. For example, an indicator that latency measurement for the packet is not enabled is stored in the data unit, e.g., the packet descriptor, associated with the packet, according to an embodiment.

If it is determined at block 204 that either i) the source network interface 108, or ii) the target network interface 108 is not enabled for latency measurement, the flow proceeds to block 220. At block 220, it is determined whether a flow to which the packet belongs is enabled for latency measurement. For example, in embodiments in which an indicator of the flow (e.g., a flow ID) to which the packet belongs is stored in the packet descriptor corresponding to the packet, the indicator of the flow in the packet descriptor is analyzed to determine whether the flow is enabled for latency measurement. In an embodiment, block 220 includes analyzing configuration information stored in a memory (e.g., the memory 148 of FIGS. 1A and 1B) to determine whether the flow to which the packet belongs is enabled for latency measurement.

If it is determined at block 220 that the flow to which the packet belongs is enabled for latency measurement, the flow proceeds to block 208. On the other hand, if it is determined at block 220 that the flow to which the packet belongs is not enabled for latency measurement, the flow proceeds to block 216.

In other embodiments, an order of blocks of the method 200 is changed, one or more blocks are omitted, additional blocks are included, etc. For example, in an embodiment, the order of blocks 204 and 220 are reversed. As another example, block 208 is omitted, and the "yes" branches from blocks 204 and 220 proceed to block 212. In yet another example, block 220 is omitted and the "no" branch from block 204 proceeds to block 216. In still another example, block 204 is omitted.

In an embodiment, the latency monitoring trigger unit 144 comprises circuitry configured to implement the method 200. For example, the circuitry comprises a hardware state machine, according to an embodiment.

Figure 3:
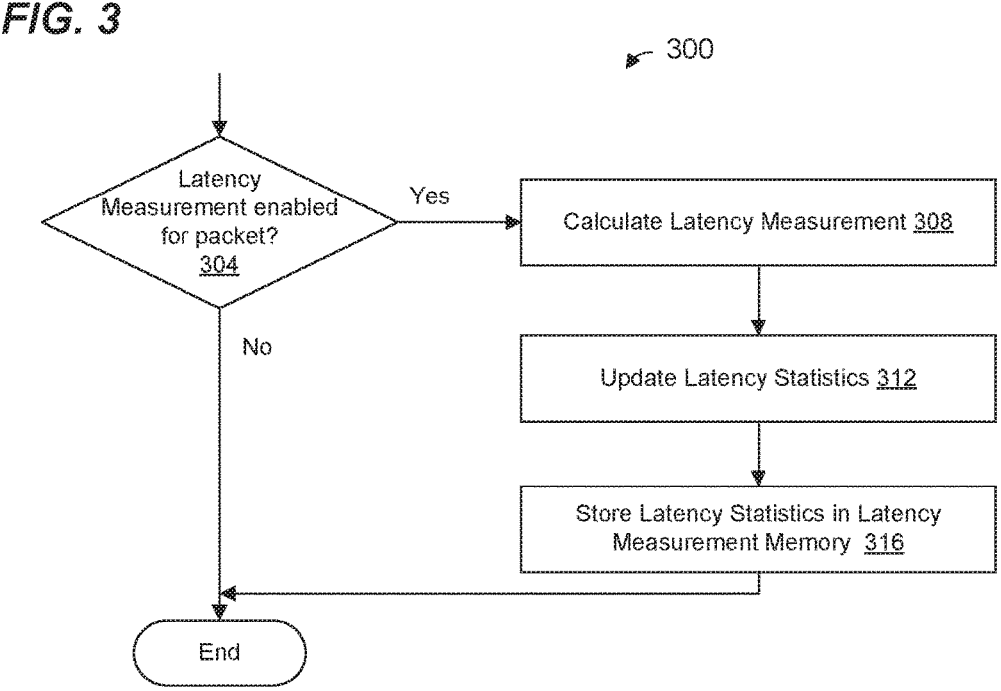
FIG. 3 is a flow diagram of an example method for selectively performing a latency measurement for a packet being processed by a network device, according to an embodiment, according to another embodiment.

FIG. 3 is a flow diagram of an example method 300 for selectively performing a latency measurement for a packet being processed by a network device, according to an embodiment. The latency measurement unit 156 (FIGS. 1A and 1B) is configured to implement the method 300, according to an embodiment, and FIG. 3 is described in the context of the network device 100 (FIGS. 1A and 1B) for explanatory purposes. In other embodiments, however, another suitable device (other than the latency measurement unit 156) is configured to implement the method 300 and/or the method 300 is performed in another suitable network device other than the network device 100 (FIGS. 1A and 1B).

At block 304, it is determined whether the packet is enabled for latency measurement. For example, an indicator of whether latency measurement for the packet is enabled is stored in a data unit, e.g., a packet descriptor, associated with the packet, according to an embodiment, and the indicator is analyzed to determine whether the packet is enabled for latency measurement. The indicator is a field (e.g., a single bit fit, a multi-bit field, etc.) in the packet descriptor, in an embodiment; and a first value of the field indicates that latency measurement for the packet is enabled, whereas a second value of the field indicates that latency measurement for the packet is not enabled.

In an embodiment, the method 300 is used in conjunction with the method 200, where the method 200 is utilized to set the field in the packet descriptor that indicates whether the packet is enabled for latency measurement. In another embodiment, another suitable method (other than the method 200) is utilized to set the field in the packet descriptor that indicates whether the packet is enabled for latency measurement.

If it is determined at block 304 that the packet is enabled for latency measurement, the flow proceeds to block 308. At block 308, a latency measurement for the packet is calculated. For instance, a transmit time is compared to a receipt time to calculate a latency measurement for the packet. In an embodiment, the transmit time and the receipt time are included in the data unit, e.g., the packet descriptor, associated with the packet, and block 308 includes retrieving the transmit time and the receipt time from the data unit associated with the packet.

At block 312, one or more latency statistics are updated using the latency measurement calculated at block 308. For instance, an average latency is updated using the latency measurement calculated at block 308. As another example, if the latency measurement calculated at block 308 is smaller than a minimum latency statistic, the minimum latency statistic is set to the latency measurement calculated at block 308. As yet another example, if the latency measurement calculated at block 308 is greater than a maximum latency statistic, the maximum latency statistic is set to the latency measurement calculated at block 308. In other embodiments, other suitable latency statistics are updated using the latency measurement calculated at block 308.

In an embodiment, the one or more latency statistics are stored in a memory, e.g., the latency measurement memory 160, and block 312 includes retrieving the one or more latency statistics from the memory and then updating the retrieved one or more latency statistics. In an embodiment, the one or more latency statistics correspond to the source network interface, target network interface pair for the packet, and block 312 includes retrieving, from the memory, the one or more latency statistics that correspond to the source network interface, target network interface pair. In an embodiment, if latency statistics that correspond to the source network interface, target network interface pair for the packet are not yet stored in the memory, block 312 includes setting the one or more latency statistics that correspond to the source network interface, target network interface pair using the measurement calculated at block 308.

In an embodiment, the one or more latency statistics correspond to a flow to which the packet belongs, and block 312 includes retrieving, from the memory, the one or more latency statistics that correspond to the flow to which the packet belongs. In an embodiment, if latency statistics that correspond to the flow are not yet stored in the memory, block 312 includes setting the one or more latency statistics that correspond to the flow using the measurement calculated at block 308.

At block 316, one or more latency statistics updated at block 312 are stored in a memory, e.g., the latency measurement memory 160.

Referring again to block 304, if it is determined at block 304 that the packet is not enabled for latency measurement, the flow ends without calculating a latency measurement or updating latency statistics. Thus, computational resources related to latency measurements are not utilized for packets that are not enabled for latency measurement.

In other embodiments, an order of blocks of the method 300 is changed, one or more blocks are omitted, additional blocks are included, etc.

In an embodiment, the latency measurement unit 156 comprises circuitry configured to implement the method 300. For example, the circuitry comprises a hardware state machine, and one or more addition and/or subtraction circuits for calculating updated latency statistics, according to an embodiment.

Figure 4:
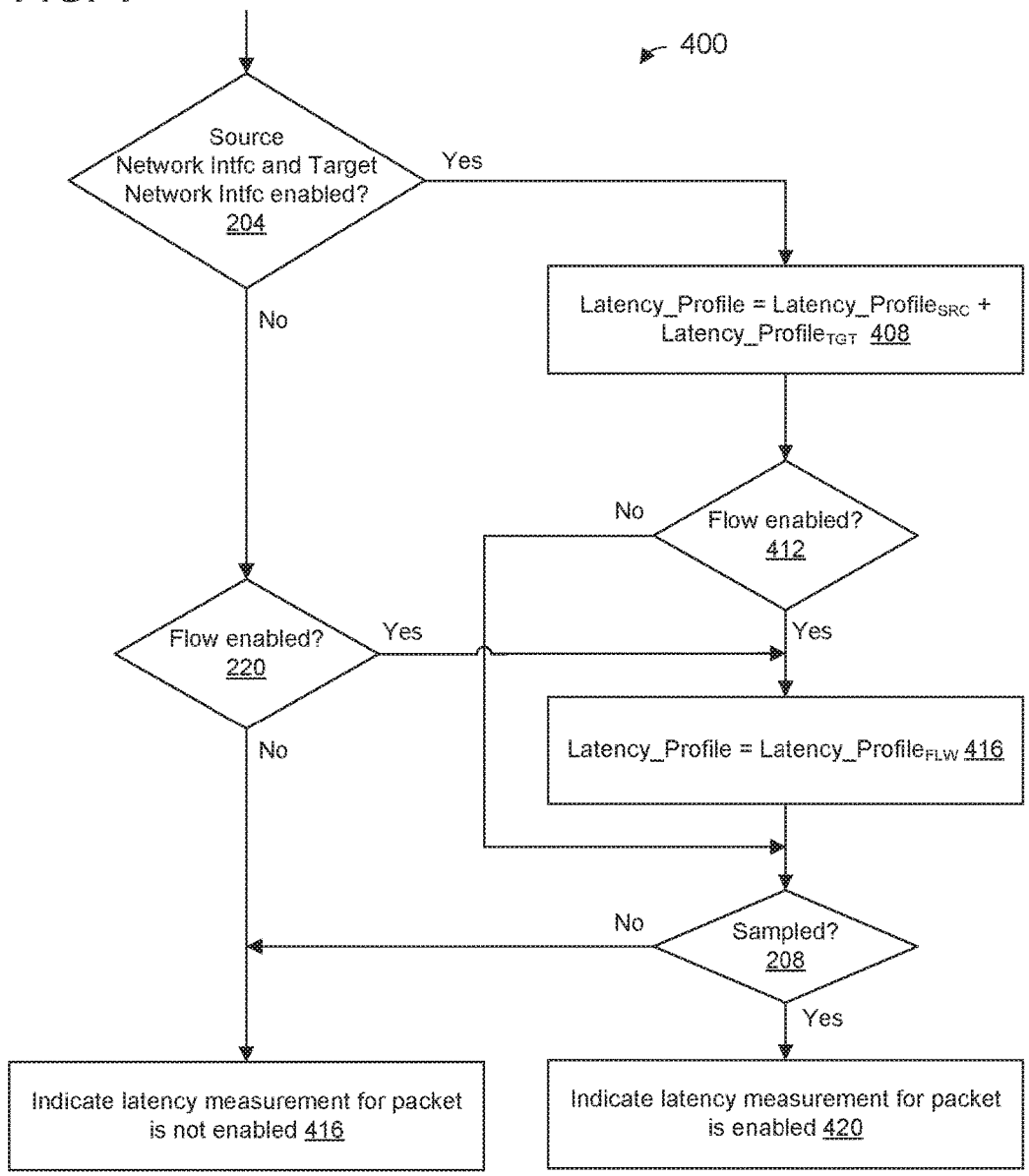
FIG. 4 is a flow diagram of another example method for determining whether a latency measurement should be performed for a packet received at a network device, according to another embodiment.

FIG. 4 is a flow diagram of another example method 400 for determining whether a latency measurement should be performed for a packet received at a network device, according to another embodiment. The latency monitoring trigger unit 144 (FIGS. 1A and 1B) is configured to implement the method 400, according to an embodiment, and FIG. 2 is described in the context of the network device 100 (FIGS. 1A and 1B) for explanatory purposes. In other embodiments, however, another suitable device (other than the latency monitoring trigger unit 144) is configured to implement the method 400 and/or the method 400 is performed in another suitable network device other than the network device 100 (FIGS. 1A and 1B).

The method 400 is similar to the method 200 of FIG. 2, and like-numbered blocks are not discussed in detail for purposes of brevity.

If it is determined at block 204 that both i) the source network interface 108, and ii) the target network interface 108 are enabled for latency measurement, the flow proceeds to block 408. At block 408, a memory location parameter (Latency_Profile) is set to indicate a location in the latency measurement memory 160 at which latency statistics are stored for a source network interface, target network interface pair, where the source network interface, target network interface pair corresponds to the packet. For example, Latency_Profile is set to Latency_Profile$_{SRC}$+Latency_Profile$_{TGT}$, where Latency_Profile$_{SRC}$ is a memory location parameter corresponding to the source network interface and Latency_Profile$_{TGT}$ is a memory location parameter corresponding to the target network interface, according to an embodiment. Latency_Profile$_{SRC}$ is a base address of a section of memory corresponding to the source network interface, and Latency_Profile$_{TGT}$ is an address offset corresponding to the target network interface, according to an embodiment. Latency_Profile$_{TGT}$ is a base address of a section of memory corresponding to the target network interface, and Latency_Profile$_{SRC}$ is an address offset corresponding to the source network interface, according to another embodiment.

In an embodiment, block 408 includes storing the parameter Latency_Profile to a field in the packet descriptor. In another embodiment, the parameter Latency_Profile is not stored in the packet descriptor at block 408.

The flow then proceeds to block 412, at which it is determined whether a flow to which the packet belongs is enabled for latency measurement. Block 412 is similar to block 220 of FIG. 2, according to an embodiment. If it is determined at block 412 that the flow to which the packet belongs is enabled for latency measurement, the flow proceeds to block 416. At block 416, the memory location parameter (Latency_Profile) is set to indicate a location in the latency measurement memory 160 at which latency statistics are stored for the flow to which the packet belongs.

In an embodiment, block 416 includes storing the parameter Latency_Profile to a field in the packet descriptor. In another embodiment, the parameter Latency_Profile is not stored in the packet descriptor at block 416.

After block 416, or if it is determined at block 412 that the flow to which the packet belongs is not enabled for latency measurement, the flow proceeds to block 208.

Block 420 is similar to block 212 of FIG. 2, and block 424 is similar to block 216 of FIG. 2 according to an embodiment. In an embodiment, block 420 includes storing the parameter Latency_Profile to a field in the packet descriptor. In another embodiment, the parameter Latency_Profile is not stored in the packet descriptor at block 420. In an embodiment, Latency_Profile is also an indicator of whether latency measurement is enabled for the packet. For example, at block 416, Latency_Profile is set to a predetermined value that indicates latency measurement is not enabled for the packet, whereas when the flow reaches block 420, Latency_Profile is set to some value that is different than the predetermined value, thus indicating that latency measurement is enabled for the packet.

In other embodiments, Latency_Profile is stored in a field in the packet descriptor separate from the field that indicates whether latency measurement is enabled for the packet.

In other embodiments, an order of blocks of the method 400 is changed, one or more blocks are omitted, additional blocks are included, etc. For example, in an embodiment, an order of the blocks 204 and 220 are reversed, and an order of the blocks 408 and 416 are reversed. As another example, block 208 is omitted, and the flow block 416 proceeds to block 420. In yet another example, blocks 220, 412, and 416 are omitted and the "no" branch from block 204 proceeds to block 416. In still another example, blocks 204, 408, and 412 are omitted.

In an embodiment, the latency monitoring trigger unit 144 comprises circuitry configured to implement the method 400. For example, the circuitry comprises a hardware state machine, according to an embodiment.

Figure 5:
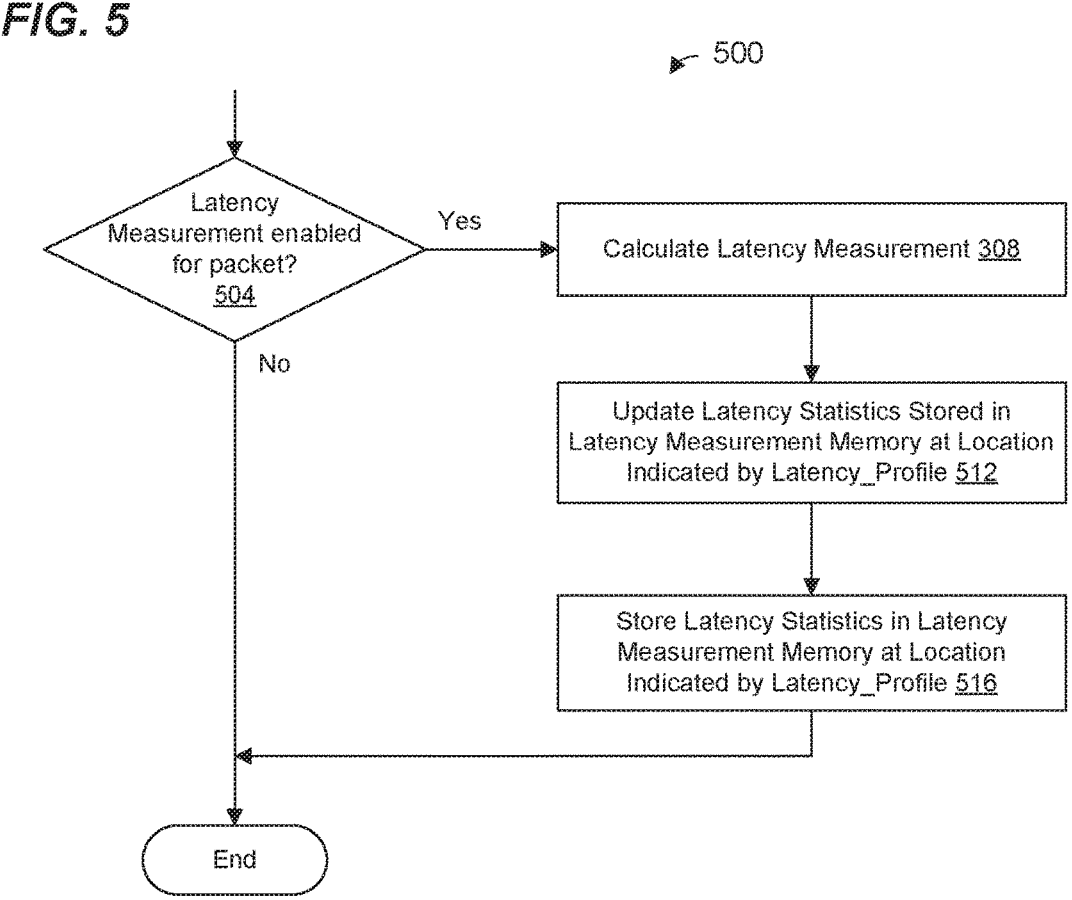
FIG. 5 is a flow diagram of another example method for selectively performing a latency measurement for a packet being processed by a network device, according to another embodiment.

FIG. 5 is a flow diagram of another example method 500 for selectively performing a latency measurement for a packet being processed by a network device, according to another embodiment. In some embodiments, the method 500 is used in conjunction with the method 400 of FIG. 4, on another suitable method.

The latency measurement unit 156 (FIGS. 1A and 1B) is configured to implement the method 500, according to an embodiment, and FIG. 5 is described in the context of the network device 100 (FIGS. 1A and 1B) for explanatory purposes. In other embodiments, however, another suitable device (other than the latency measurement unit 156) is configured to implement the method 500 and/or the method 500 is performed in another suitable network device other than the network device 100 (FIGS. 1A and 1B).

The method 500 is similar to the method 300 of FIG. 3, and like-numbered blocks are not discussed in detail for purposes of brevity.

At block 504, it is determined whether the packet is enabled for latency measurement. Block 504 is similar to block 304 of FIG. 3, in some embodiments. In embodiments in which the parameter Latency_Profile in the packet descriptor also serves as an indicator of whether the packet is enabled for latency measurement, block 504 includes comparing the parameter Latency_Profile to a predetermined value that indicates that the packet is not enabled for latency measurement.

If it is determined that the packet is not enabled for latency measurement, the flow ends. On the other hand, if it is determined that the packet is enabled for latency measurement, the flow proceeds to block 308 at which a latency measurement for the packet is calculated.

After block 308, the flow proceeds to block 512. At block 512, one or more latency statistics are updated using the latency measurement calculated at block 308. Block 512 is similar to block 312 of FIG. 3, in some embodiments. In an embodiment, the one or more latency statistics are stored in the latency measurement memory 160 at a location indicated by the parameter Latency_Profile, and block 512 includes retrieving the one or more latency statistics from the memory at the location indicated by the parameter Latency_Profile, and then updating the retrieved one or more latency statistics. In an embodiment, if latency statistics are not yet stored in the memory at the location indicated by the parameter Latency_Profile, block 512 includes setting the one or more latency statistics using the measurement calculated at block 308.

At block 516, one or more latency statistics updated at block 512 are stored in the latency measurement memory 160 at the location indicated by the parameter Latency_Profile.

In other embodiments, an order of blocks of the method 500 is changed, one or more blocks are omitted, additional blocks are included, etc.

In an embodiment, the latency measurement unit 156 comprises circuitry configured to implement the method 500. For example, the circuitry comprises a hardware state machine, and one or more addition and/or subtraction circuits for calculating updated latency statistics, according to an embodiment.

As discussed above, in some embodiments, the latency measurement unit 156 is configured to calculate an average latency using a latency measurement. The latency measurement unit 156 uses any suitable method for calculating the average latency, in various embodiments. One illustrative method for calculating an average for a series of values is described below, which the latency measurement unit 156 uses to calculate the average latency, in some embodiments. The illustrative method for calculating an average is used by the network device 100, or another suitable network device, to calculate an average of another suitable parameter, such as a packet delay metric between the network device 100 and another network device, a packet loss metric, etc.

Given a series of values $x_1, x_2, x_3, \ldots$, an exponentially weighted moving average (EWMA) for the series of values is defined as:

$$A_{n+1}=(1-\alpha)A_n+\alpha x_{n+1} \quad \text{Equation 1}$$

where n is an index, $A_1=x_1$ (e.g., $A_1$ is the EWMA of $x_1$), $A_n$ is the EWMA after the nth value of x ($x_n$), and $\alpha$ is a parameter between zero and one. If $\alpha$ is required to be $\frac{1}{2}^M$, where M is a positive integer, then Equation 1 can be rewritten as:

$$A_{n+1}=(2^M A_n - A_n + x_{n+1})/2^M \quad \text{Equation 2}$$

Multiplying a number represented as a sequence of binary digits (e.g., bits) by $2^M$ can be computed by left-shifting the number M times (denoted by <<M). Similarly, dividing a number represented as a sequence of binary digits (e.g., bits) by $2^M$ can be computed by right-shifting the number M times (denoted by >>M). Thus, Equation 2 can be rewritten as:

$$A_{n+1}=(A_n<<M-A_n+x_{n+1})>>M \quad \text{Equation 3}$$

In an embodiment, an average latency statistic ($\text{Latency}_{AVG}$) is updated using a new latency measurement ($\text{Latency}_{NEW}$) according to:

$$\text{Latency}_{AVG,updated}=(\text{Latency}_{AVG}<<M-\text{Latency}_{AVG}+\text{Latency}_{NEW})>>M \quad \text{Equation 4}$$

In an embodiment, the latency measurement unit 156 comprises circuitry configured to calculate Equation 3 and/or Equation 4. For example, the circuitry comprises a hardware state machine, one or more shift registers, and one or more addition and/or subtraction circuits, according to an embodiment.

Figure 6:
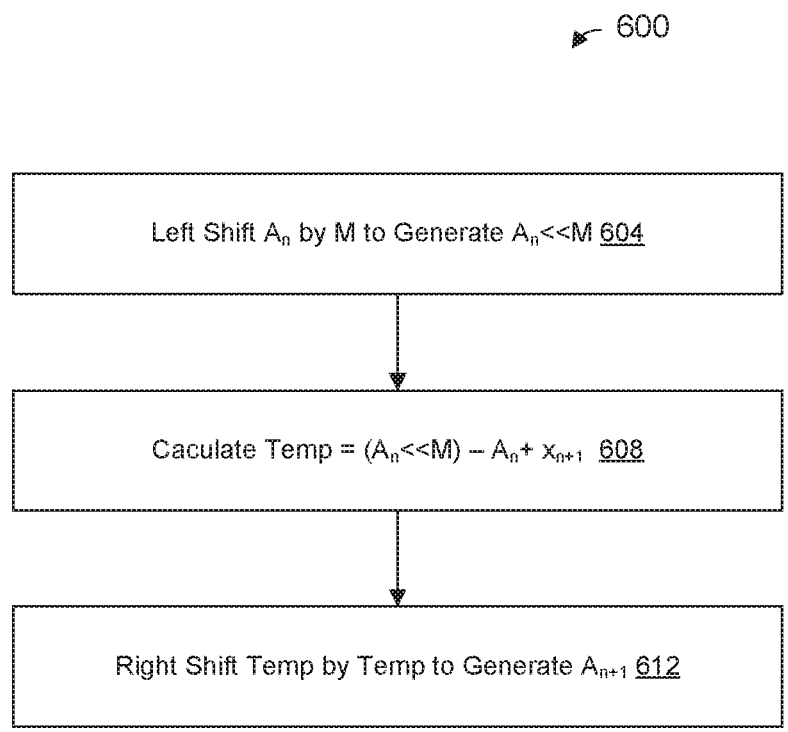
FIG. 6 is a flow diagram of an example method for calculating an exponentially weighted moving average (EWMA), according to another embodiment.

FIG. 6 is a flow diagram of an example method 600 for calculating an EWMA for a series of values $x_1, x_2, x_3, \ldots$, according to another embodiment. The latency measurement unit 156 (FIGS. 1A and 1B) is configured to implement the method 600, according to an embodiment. In other embodiments, however, another suitable device (other than the latency measurement unit 156) is configured to implement the method 600. In some embodiments, the latency measurement unit 156 (FIGS. 1A and 1B) is configured to use the method 600 to calculate Equation 3 and/or Equation 4 in conjunction with updating a latency statistic.

At block 604, a previous EWMA $A_n$ is left shifted M times. In an embodiment, block 604 comprises loading $A_n$ into a shift register and controlling the shift register to left-shift $A_n$ M times to generate $A_n<<M$.

At block 608, TEMP=$A_n<<M-A_n+x_n$ is calculated. Block 608 comprises first calculating Temp=$A_n<<M-A_n$, and then calculating Temp=Temp+$x_n$, according to an embodiment. Block 608 comprises first calculating Temp=$A_n<<M+x_n$, and then calculating Temp=Temp-$A_n$, according to another embodiment. Block 608 comprises first calculating Temp=$x_n-A_n$, and then calculating Temp=Temp+$A_n<<M$, according to yet another embodiment. In an embodiment, block 608 comprises using one or more addition and/or subtraction circuits.

At block 612, the EWMA $A_{n+1}$ is calculated by right-shifting Temp M times. In an embodiment, block 612 comprises loading Temp into a shift register and controlling the shift register to right-shift Temp M times to generate $A_{n+1}$.

In an embodiment, a network device comprises a plurality of network interfaces configured to couple to a plurality of network links, wherein network interfaces among the plurality of network interfaces include, or are associated with, respective time measurement units configured to measure a) receipt times at which packets are received via network links and b) transmit times at which packets are transmitted via network links. The network device also comprises one or more memories to store configuration information, the configuration information indicating certain network interface pairs and/or certain packet flows that are enabled for latency measurement. Additionally, the network device comprises a packet processor coupled to the plurality of network interfaces, the packet processor including: a latency monitoring trigger unit coupled to the one or more memories, the latency monitoring trigger unit configured to select, using the configuration information, packets that are forwarded between the certain network interface pairs and/or that belong to the certain packet flows for latency monitoring. The network device further comprises one or more latency measurement units coupled to the one or more memories, the one or more latency measurement units configured to: determine respective latencies for packets selected by the latency monitoring trigger unit using respective receipt times and respective transmit times for the packets selected by the latency monitoring trigger unit, calculate latency statistics for the certain network interface pairs and/or the certain packet flows using the respective latencies, and store the latency statistics in the one or more memories.

In other embodiments, the network device also comprises one of, or any suitable combination of two or more of, the following features.

The one or more memories store per-interface information indicating network interfaces, among the plurality of network interfaces, that are enabled for latency measurement; and the latency monitoring trigger unit is configured to: identify packets that are being forwarded between pairs of enabled network interfaces using the per-interface information, and responsive to identifying packets that are being forwarded between pairs of enabled network interfaces, select packets for latency monitoring that are being forwarded between pairs of enabled network interfaces.

The packet processor includes a classifier configured to identify packet flows with which packets are associated; the one or more memories store packet flow configuration information indicating packet flows, among a plurality of packet flows, that are enabled for latency measurement; and the latency monitoring trigger unit is configured to: identify packets that belong to flows enabled for latency measurement using the packet flow configuration information, and responsive to identifying packets that belong to flows enabled for latency measurement, select packets for latency monitoring that belong to flows enabled for latency measurement.

The packet processor is configured to generate respective packet descriptors for packets received via the plurality of network interfaces; the latency monitoring trigger unit is configured to store, in selected packet descriptors, information that indicates packets corresponding to the selected packet descriptors are selected for latency monitoring; and the one or more latency measurement units are configured to determine for which packets latency statistics are to be calculated using information in the packet descriptors.

The latency monitoring trigger unit is configured to store, in packet descriptors corresponding to packets selected for latency monitoring, information that indicates where in the one or more memories latency statistics for packets selected for latency monitoring are to be stored; and the one or more latency measurement units are configured to store latency statistics in the one or more memories at locations determined using information in the packet descriptors.

The one or more latency measurement units are configured to: determine a latency for a packet selected by the latency monitoring trigger unit for latency monitoring by comparing a receipt time of the packet and a transmit time of the packet; calculate an updated average latency using a previously calculated average latency stored in the one or more memories and the determined latency for the packet; and store the updated average latency in the one or more memories.

The one or more latency measurement units are configured to: calculate the average latency as an exponentially weighted moving average (EWMA).

The one or more latency measurement units include one or more shift registers; and the one or more latency measurement units are configured to calculate the EWMA at least by: calculating a multiplication of the previously calculated average latency by a parameter by left shifting the previously calculated average latency in the one or more shift registers, and calculating a division of an intermediate calculation by the parameter by right shifting the previously calculated average latency in the one or more shift registers.

The one or more memories comprise a first memory and a second memory; the first memory stores the configuration information; the latency monitoring trigger unit is coupled to the first memory and is configured to use the configuration information stored in the first memory; and the one or more latency measurement units are coupled to the second memory and are configured to store the latency statistics in the second memory.

The one or more memories comprise a single memory; the single memory stores the configuration information; the latency monitoring trigger unit is coupled to the single memory and is configured to use the configuration information stored in the single memory; and the one or more latency measurement units are coupled to the single memory and are configured to store the latency statistics in the single memory.

At least some of the latency measurement units are included in respective network interfaces.

In another embodiment, a method includes: receiving a plurality of packets via a plurality of network interfaces of a network device; measuring, at the network device, respective receipt times at which packets were received via network links among the plurality of network interfaces; selecting, at the network device, packets that are being forwarded between certain network interface pairs and/or belong to certain packet flows for measuring latency using configuration information stored in one or more memories of the network device, the configuration information indicating certain network interface pairs and/or certain packet flows that are enabled for latency measurement; measuring, at the network device, respective transmit times at which packets are transmitted via network links among the plurality of network links; determining, at the network device, respective latencies for selected packets, that are being forwarded between the certain network interface pairs and/or belong to the certain packet flows indicated by the configuration information, using respective receipt times and respective transmit times for the selected packets; and storing the latency information corresponding to the certain network interface pairs and/or the certain packet flows in the one or more memories of the network device.

In other embodiments, the method also includes one of, or any suitable combination of two or more of, the following features.

The method further includes: identifying, at the network device, packets that are being forwarded between pairs of enabled network interfaces using per-interface information, stored in the one or more memories, that indicates network interfaces, among the plurality of network interfaces, that are enabled for latency measurement; and responsive to identifying packets that are being forwarded between pairs of enabled network interfaces, selecting, at the network device, packets for latency measurements that are being forwarded between pairs of enabled network interfaces.

The method further includes: identifying, at the network device, packet flows with which packets are associated; identifying, at the network device, packets that belong to flows enabled for latency measurement using packet flow configuration information, stored in the one or more memories, that indicates packet flows, among a plurality of packet flows, that are enabled for latency measurement; and responsive to identifying packets that belong to flows enabled for latency measurement, selecting, at the network device, packets for latency monitoring that belong to flows enabled for latency measurement.

The method further includes: generating respective packet descriptors for packets received via the plurality of network interfaces; storing, in packet descriptors corresponding to packets that are selected for latency monitoring, information that indicates the packets are selected for latency monitoring; and determining for which packets latency statistics are to be calculated using information in the packet descriptors.

The method further includes: storing, in packet descriptors corresponding to packets that are selected for latency monitoring, information that indicates where in the one or more memories latency statistics for packets that are selected for latency monitoring are to be stored; and storing latency statistics in the one or more memories at locations determined using information in the packet descriptors corresponding to packets that are selected for latency monitoring.

The method further includes: calculating an updated average latency using a previously calculated average latency stored in the one or more memories and a determined latency for a packet; and storing the updated average latency in the one or more memories.

Calculating the updated average latency comprises calculating an exponentially weighted moving average (EWMA).

Calculating the EWMA comprises: calculating a multiplication of the previously calculated average latency by a parameter by left shifting the previously calculated average latency; and calculating a division of an intermediate calculation by the parameter by right shifting the previously calculated average latency.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or. ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of network interfaces configured to couple to a plurality of network links, wherein network interfaces among the plurality of network interfaces include, or are associated with, respective time measurement units configured to measure a) receipt times at which packets are received via network links and b) transmit times at which packets are transmitted via network links;
one or more memories to store configuration information, the configuration information indicating certain network interface pairs and/or certain packet flows that are enabled for latency measurement;
a packet processor coupled to the plurality of network interfaces, the packet processor including:
a latency monitoring trigger unit coupled to the one or more memories, the latency monitoring trigger unit configured to select, using the configuration information, packets that are forwarded between the certain network interface pairs and/or that belong to the certain packet flows for latency monitoring; and
one or more latency measurement units coupled to the one or more memories, the one or more latency measurement units configured to:
determine respective latencies for packets selected by the latency monitoring trigger unit using respective receipt times and respective transmit times for the packets selected by the latency monitoring trigger unit, so that, for packets that are not selected by the latency monitoring trigger unit, no latencies are determined by the network device,
calculate latency statistics for the certain network interface pairs and/or the certain packet flows using the respective latencies,
store the latency statistics in the one or more memories,
calculate, as an exponentially weighted moving average (EWMA), an updated average latency using a previously calculated average latency stored in the one or more memories and a determined latency for a packet, and
store the updated average latency in the one or more memories.

2. The network device of claim 1, wherein:
the one or more memories store per-interface information indicating network interfaces, among the plurality of network interfaces, that are enabled for latency measurement; and
the latency monitoring trigger unit is configured to:
identify packets that are being forwarded between pairs of enabled network interfaces using the per-interface information, and
responsive to identifying packets that are being forwarded between pairs of enabled network interfaces, select packets for latency monitoring that are being forwarded between pairs of enabled network interfaces.

3. The network device of claim 1, wherein:
the packet processor includes a classifier configured to identify packet flows with which packets are associated;
the one or more memories store packet flow configuration information indicating packet flows, among a plurality of packet flows, that are enabled for latency measurement; and
the latency monitoring trigger unit is configured to:
identify packets that belong to flows enabled for latency measurement using the packet flow configuration information, and
responsive to identifying packets that belong to flows enabled for latency measurement, select packets for latency monitoring that belong to flows enabled for latency measurement.

4. The network device of claim 1, wherein:
the packet processor is configured to generate respective packet descriptors for packets received via the plurality of network interfaces;
the latency monitoring trigger unit is configured to store, in selected packet descriptors, information that indicates packets corresponding to the selected packet descriptors are selected for latency monitoring; and
the one or more latency measurement units are configured to determine for which packets latency statistics are to be calculated using information in the packet descriptors.

5. The network device of claim 4, wherein:
the latency monitoring trigger unit is configured to store, in packet descriptors corresponding to packets selected for latency monitoring, information that indicates where in the one or more memories latency statistics for packets selected for latency monitoring are to be stored; and
the one or more latency measurement units are configured to store latency statistics in the one or more memories at locations determined using information in the packet descriptors.

6. The network device of claim 1, wherein the one or more latency measurement units are configured to:
determine the latency for the packet by comparing a receipt time of the packet and a transmit time of the packet.

7. The network device of claim 1, wherein:
the one or more latency measurement units include one or more shift registers; and
the one or more latency measurement units are configured to calculate the EWMA at least by:
calculating a multiplication of the previously calculated average latency by a parameter by left shifting the previously calculated average latency in the one or more shift registers, and
calculating a division of an intermediate calculation by the parameter by right shifting the previously calculated average latency in the one or more shift registers.

8. The network device of claim 1, wherein:
the one or more memories comprise a first memory and a second memory;
the first memory stores the configuration information;

the latency monitoring trigger unit is coupled to the first memory and is configured to use the configuration information stored in the first memory; and the one or more latency measurement units are coupled to the second memory and are configured to store the latency statistics in the second memory.

9. The network device of claim 1, wherein:

the one or more memories comprise a single memory;

the single memory stores the configuration information;

the latency monitoring trigger unit is coupled to the single memory and is configured to use the configuration information stored in the single memory; and the one or more latency measurement units are coupled to the single memory and are configured to store the latency statistics in the single memory.

10. The network device of claim 1, wherein at least some of the latency measurement units are included in respective network interfaces.

11. A method, comprising:

receiving a plurality of packets via a plurality of network interfaces of a network device;

measuring, at the network device, respective receipt times at which packets were received via network links among the plurality of network interfaces;

selecting, at the network device, packets that are being forwarded between certain network interface pairs and/or belong to certain packet flows for measuring latency using configuration information stored in one or more memories of the network device, the configuration information indicating certain network interface pairs and/or certain packet flows that are enabled for latency measurement;

measuring, at the network device, respective transmit times at which packets are transmitted via network links among the plurality of network links;

determining, at the network device, respective latencies for selected packets, that are being forwarded between the certain network interface pairs and/or belong to the certain packet flows indicated by the configuration information, using respective receipt times and respective transmit times for the selected packets, so that, for packets that are not selected, no latencies are determined by the network device;

storing the latency information corresponding to the certain network interface pairs and/or the certain packet flows in the one or more memories of the network device;

calculating, as an exponentially weighted moving average (EWMA), an updated average latency using a previously calculated average latency stored in the one or more memories and a determined latency for a packet; and storing the updated average latency in the one or more memories.

12. The method of claim 11, further comprising:

identifying, at the network device, packets that are being forwarded between pairs of enabled network interfaces using per-interface information, stored in the one or more memories, that indicates network interfaces, among the plurality of network interfaces, that are enabled for latency measurement; and responsive to identifying packets that are being forwarded between pairs of enabled network interfaces, selecting, at the network device, packets for latency measurements that are being forwarded between pairs of enabled network interfaces.

13. The method of claim 11, further comprising:

identifying, at the network device, packet flows with which packets are associated;

identifying, at the network device, packets that belong to flows enabled for latency measurement using packet flow configuration information, stored in the one or more memories, that indicates packet flows, among a plurality of packet flows, that are enabled for latency measurement; and responsive to identifying packets that belong to flows enabled for latency measurement, selecting, at the network device, packets for latency monitoring that belong to flows enabled for latency measurement.

14. The method of claim 11, further comprising:

generating respective packet descriptors for packets received via the plurality of network interfaces;

storing, in packet descriptors corresponding to packets that are selected for latency monitoring, information that indicates the packets are selected for latency monitoring; and determining for which packets latency statistics are to be calculated using information in the packet descriptors.

15. The method of claim 14, further comprising:

storing, in packet descriptors corresponding to packets that are selected for latency monitoring, information that indicates where in the one or more memories latency statistics for packets that are selected for latency monitoring are to be stored; and storing latency statistics in the one or more memories at locations determined using information in the packet descriptors corresponding to packets that are selected for latency monitoring.

16. The method of claim 11, wherein calculating the EWMA comprises:

calculating a multiplication of the previously calculated average latency by a parameter by left shifting the previously calculated average latency; and calculating a division of an intermediate calculation by the parameter by right shifting the previously calculated average latency.

* * * * *